(12) United States Patent
Doerfel

(10) Patent No.: US 6,394,718 B1
(45) Date of Patent: May 28, 2002

(54) GENERATION OF PERIODIC STRUCTURES ON ROTATIONALLY SYMMETRICAL COMPONENTS

(75) Inventor: Oliver Doerfel, Plochingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/705,864

(22) Filed: Nov. 6, 2000

(30) Foreign Application Priority Data

Nov. 4, 1999 (DE) .......................................... 199 53 089

(51) Int. Cl.[7] .................................................. B23C 3/00
(52) U.S. Cl. ........................ 409/132; 409/165; 409/293
(58) Field of Search ................................ 409/165, 131, 409/132, 26, 27, 37, 38, 39, 42, 46, 50, 51, 56, 57, 58, 293, 318

(56) References Cited

U.S. PATENT DOCUMENTS

| | | | | |
|---|---|---|---|---|
| 4,624,610 A | * | 11/1986 | Phillips et al. | 409/132 |
| 4,863,321 A | * | 9/1989 | Lieser | 409/165 |
| 4,865,497 A | | 9/1989 | Faulstich | 409/12 |
| 4,883,392 A | * | 11/1989 | Liester | 409/165 |
| 5,431,514 A | * | 7/1995 | Saitu et al. | 409/132 |

FOREIGN PATENT DOCUMENTS

| | | |
|---|---|---|
| DE | 911 689 | 4/1954 |
| DE | 31 28 563 | 2/1983 |
| DE | 32 38 442 | 4/1984 |
| DE | 35 33 064 | 3/1987 |
| DE | 38 26 159 | 2/1990 |
| DE | 39 15 976 | 11/1990 |
| DE | 41 22 460 | 4/1992 |
| DE | 44 01 199 | 7/1995 |
| EP | 0 522 453 | 1/1993 |

* cited by examiner

Primary Examiner—William Briggs
(74) Attorney, Agent, or Firm—Crowell & Moring LLP

(57) ABSTRACT

The invention relates to the generation of periodic profiles on at least approximately rotationally symmetrical blanks, such as, for example, the generation of shaft-hub connection profiles such as circular wedge profiles, splined shaft profiles, etc., on shaft or hub blanks. To this end, the use of generating skiving is proposed, which permits the production of any desired periodic profiles on rotationally symmetrical blanks and is far superior to rival processes with regard to the productive machining time.

11 Claims, 2 Drawing Sheets

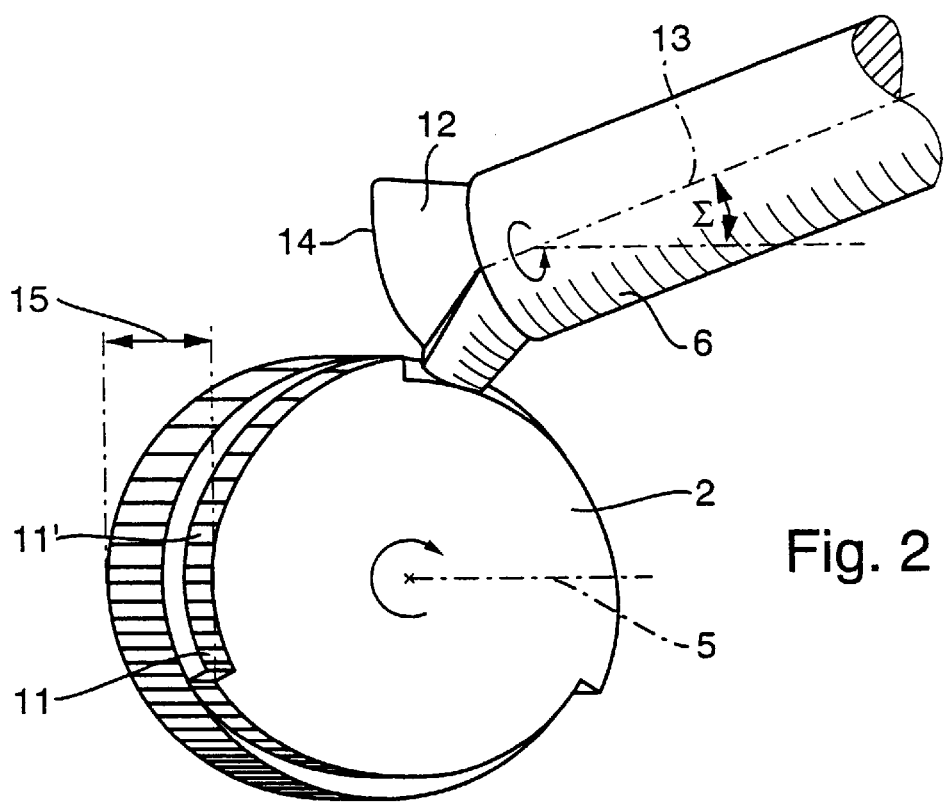
Fig. 2
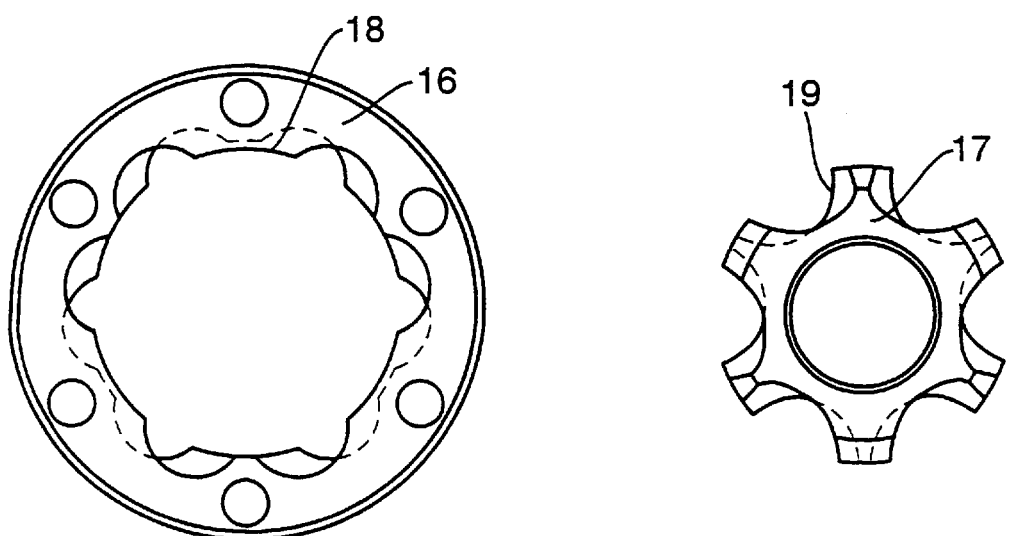
Fig. 3a
Fig. 3b

GENERATION OF PERIODIC STRUCTURES ON ROTATIONALLY SYMMETRICAL COMPONENTS

BACKGROUND AND SUMMARY OF THE DISCLOSURE

This application claims the priority of 199 53 089.0, filed in Germany, Nov. 4, 1999, the disclosure of which is expressly incorporated by reference herein.

The invention relates to a method of generating a periodic profile on an at least approximately rotationally symmetrical blank.

Many rotationally symmetrical components have periodic structures which have to be generated in a highly precise manner. Examples of this are shaft-hub connections in which the shaft is provided in the connecting region with a profile which is to be produced in a highly precise manner and which in the assembly position engages in a hub profile which is likewise to be produced in a highly precise manner. In this case, especially high demands are imposed on the accuracy of the contour generation and on the surface quality of the joining faces by such connecting profiles in which there are large contact surfaces between shaft and hub in the assembly position, in other words the force transmission is effected mainly by friction grip (e.g. polygonal profiles or circular wedge profiles) . At present, the production of such components, as described in German Patent Document DE 44 01 199, is carried out, for example, by means of grinding processes, in which the tool movements have to be geared exactly to the profile to be produced. These production processes are very time-consuming and thus costly. There is therefore a considerable requirement for a method by means of which these periodic structures can be produced quickly and cost-effectively.

An object of the invention is therefore to propose a method by means of which periodic structures can be generated on rotationally symmetrical components in a highly precise, quick and cost-effective manner.

This object is achieved according to the invention by use of generating skiving for generating a periodic profile, except flanks of external and internal tooth systems, on an approximately rotationally symmetrical blank.

Accordingly, the kinematics of generating skiving are used to generate the periodic structures. This method has been known for a long time, but was hitherto used exclusively for the machining of involute external and internal tooth systems. The use of generating skiving for generating tooth systems is described, for example, in German Patent Documents DE 35 33 064 (corresponding to U.S. Pat. No. 4,865,497), DE 39 15 976 and DE 41 22 460 (corresponding to EP 052243).

Compared with rival processes for producing periodic structures on rotationally symmetrical components, such as, for example, milling, form milling, broaching, rotary milling, turning or grinding, the chips produced during generating skiving are especially favorable with regard to their geometrical form and chip thickness, so that especially quick machining of the desired profile is made possible. Compared with these rival processes, the productive time during the machining of the workpiece is therefore especially short in the case of generating skiving. The periodic profile is generated in a single cut, which may be followed by further equalizing and finishing cuts with the same kinematics, in order to 5 increase the quality of the workpiece. Furthermore, machine tools are now available which permit high-precision matching of the workpiece axis with the tool axis at high rotational speeds and thus permit the generation of a wide range of different periodic structures with high precision. The tool contour for a specific periodic pattern, which contour may be very complex, can be calculated exactly from the desired workpiece geometry. Generating skiving is therefore suitable in particular for the production of complex periodic structures on approximately rotationally symmetrical components, such as, for example splined shafts, circular wedge shafts, polygonal shafts, ring joint hubs and joint rings.

In order to permit high cutting speeds and thus short production times, it is favorable to use a machine tool having high-precision axes and high rates of revolution of at least 1000–2000 revolutions/minute. In the interests of a high cutting speed with high accuracy to shape of the finished workpiece, it is also expedient to set the skew angle between workpiece and tool to between 15° and 25°, preferably approximately 20°. In addition, at the high cutting speeds occurring during generating skiving, it is advantageous to use a carbide tool which is provided with an anti-wear coating.

The invention is explained in more detail below with reference to an exemplary embodiment shown in the drawings.

Other objects, advantages and novel features of the present invention will become apparent from the following detailed description of the invention when considered in conjunction with the accompanying drawings.

BRIEF DESCRIPTION OF THE DRAWINGS

FIG. 2 shows a schematic representation of a blank with circular wedge profile and a shaving wheel used for machining same using a method according to a preferred embodiment of the invention; and FIGS. 3a and 3b show examples of further workpieces machined by generating skiving according to preferred embodiments of the invention with FIG. 3a showing a joint ring and FIG. 3b showing a ring joint hub.

DETAILED DESCRIPTION OF THE DISCLOSURE

Figure 1:
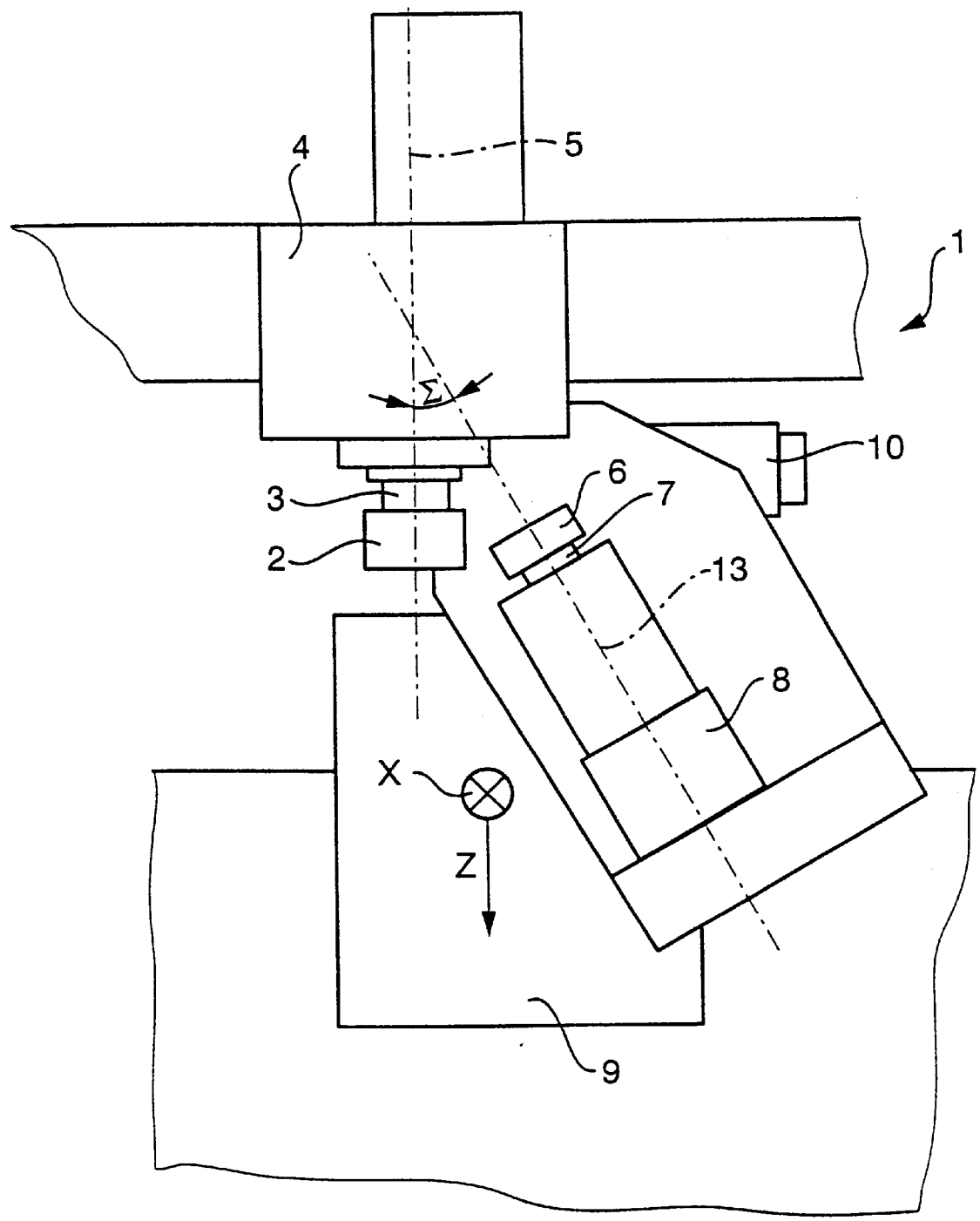
FIG. 1 shows a schematic side view of a generating skiving system, the shaving head of which is swivelled by an angle to the axis of a blank to be machined, constructed according to a preferred embodiment of the invention.

FIG. 1 shows a schematic view of a generating skiving system 1 for machining an approximately rotationally symmetrical blank 2, which is clamped in position on the generating skiving system 1 in a work spindle 3 of a work-spindle unit 4 in such a way that the axis of rotation of the blank 2 is oriented approximately parallel to the spindle axis 5. The machining tool used is a shaving wheel 6, which is clamped in position in a tool spindle 7 of a shaving head 8. The shaving head 8 is displaceable in the direction of the Z-axis (i.e. parallel to the work-spindle axis 5) by means of an axial slide 9 and is displaceable in the direction of the X-axis (perpendicularly to the work-spindle axis 5) by means of a radial slide 10 fastened to the axial slide 9; the shaving head 8 is swivel-mounted on the radial slide 10.

To machine the blank 2, both the shaving wheel 6 and the blank 2 perform rotary movements, as shown in FIG. 2, and they both have the same direction of rotation and mesh with one another with skew rotation axes like a skew gear transmission. In this case, the shaving wheel 6 and the blank 2 rotate in an inverse ratio to the respective number of periodic structures to be produced; for example, if the threefold circular wedge profile 11 shown in FIG. 2 is to be produced on the blank 2, and if the shaving wheel 6, as shown in FIG. 2, has an outer contour 12 which corresponds to a mating profile having two circular wedges, the rotational speed of the tool spindle 7 must be 1½ times as fast as the rotational speed of the work spindle 3.

Starting from a cylindrical or conical basic shape, the outer contour 12 of the shaving wheel 6 is matched to the profile 11 to be generated on the blank 2 in such a way that the shaving wheel 6 cuts the desired profile 11 into the blank 2 during the above described mutual rolling of blank 2 and shaving wheel 6. The spindle axes 5 and 13 of the blank 2 and the shaving wheel 6 are swivelled relative to one another by an axis intersection angle Σ during the machining. To generate a high-precision periodic profile 11 of predetermined geometry on the blank 2, it must be ensured that the spindle axes 5, 13 are matched to one another in a highly precise manner. In order to achieve a high cutting speed, it is favorable to select as large an axis intersection angle Σ as possible; to produce circular wedge profiles 11', an axis intersection angle Σ within the range between 15° and 25° has proved to be favorable. Furthermore, high revolution rates of the work and tool spindles 3, 7 are necessary for achieving a high cutting speed; the rates should expediently be around at least 1000 to 2000 revolutions/min.

During the machining, the cutting edge 14 of the shaving wheel 6 moves towards the blank 2 and removes a chip in the process; in this way, the final shape of the profile 11 to be produced is obtained on the blank 2 at the machined location. To machine the entire axial width 15 of the blank 2, the rotating shaving wheel 6 is moved towards the blank 2 in the Z-direction by means of the axial slide 9. During this translatory movement, the entire desired profile 11 is produced on the blank 2 in only a single axial movement of the shaving head 8 relative to the blank 2. In order to produce an axially symmetrical profile 11 on the blank 2, a parallel movement of the center line of the shaving wheel 6 relative to the center line of the blank 2 must be ensured in this case, which necessitates a differential rotation of the two spindle axes 5, 13 relative to one another.

By an additional superimposition of the axial movement of the axial slide 9 with a movement of the radial slide 10, i.e. by a displacement of the rotating shaving wheel 6 in the X-direction, the blank 2 can additionally be provided with convexity or conicity.

The method according to the invention permits very time-saving production of the profile 11, since the rotational speeds of the machine tool enable a high cutting speed to be achieved with good cross-sectional area of cut and favorable chip form. The productive time for generating the profile 11 can therefore be reduced by a factor of ten or more compared with alternative methods such as turning, milling, etc. In order to minimize the wear of the shaving wheel 6 and thus achieve long tool life, it is advisable to use a carbide shaving wheel 6 with an anti-wear coating.

To calculate the requisite outer contour 12 of the shaving wheel 6, the entire kinematics of the generating skiving process must also be taken into account. The outer contour 12 of the shaving wheel 6 is therefore not the negative of the shape of the desired profile 11 on the blank 2, but is a distorted reference profile in which the axis intersection angle Σ and its effect on the mutual rolling of blank 2 and shaving wheel 6 are explicitly included. In order to achieve a good cutting result, the shaving wheel 6 must enclose certain clearance angles and rake angles relative to the blank 2. If a cylindrical shaving wheel 6 is used, a clearance angle can be obtained by providing an offset of the axes or a cutting-face offset between shaving wheel 6 and blank 2. A cylindrical shaving wheel 6 has the further advantage that the tool contour is retained in this case when re-sharpening the shaving wheel 6.

In addition to the above described production of the threefold circular wedge profile 11', shown in FIG. 2, on the blank 2, circular wedge profiles of any desired fold symmetry may be produced. Furthermore, generating skiving may be used to generate any desired shaft profiles, such as, for example, splined shaft profiles, polygonal profiles, etc., on blanks. In addition, the use according to the invention of generating skiving permits the production of any desired periodic structures on approximately rotationally symmetrical blanks and is suitable for the generation of both external and internal profiles. Examples of this are shown in FIGS. 3a and 3b, which show a joint ring 16 and a ring joint hub 17.

Both the internal profile 18 of the joint ring 16 and the external profile 19 of the ring joint hub 17 can be produced by means of generating skiving. As described above, the external profiles 12 of the shaving wheels 6 required for this are calculated from the geometry of the desired internal profile 17 or external profile 19 while taking into account the kinematics of the generating skiving geometry selected (axis intersection angle Σ and fold symmetry of the axis of symmetry of the respective shaving wheel 6).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of making a part, comprising use of a generating skiving system for generating a periodic profile, except flanks of external and internal tooth systems, on an approximately rotationally symmetrical blank, the skiving system including a work spindle unit having a work spindle and defining a work spindle axis, the blank clamped in position in the work spindle such that an axis of rotation of the blank is oriented approximately parallel to the work spindle axis, and a machining tool having a shaving wheel which is clamped in position in a tool spindle of a shaving head, wherein the shaving head is displaceable in a direction of an axis that is parallel to the work spindle axis by means of an axial slide and is displaceable in a direction of an axis perpendicular to the work spindle axis by means of a radial slide fastened to the axial slide, wherein the shaving head is swivel-mounted on the radial slide, the method further including the step of rotating the shaving wheel and the blank.

2. Method according to claim 1, wherein a circular wedge profile and/or a splined shaft profile and/or a polygonal shaft profile and/or a profile of a joint ring and/or a ring joint hub is produced by means of generating skiving.

3. Method according to claim 1, wherein cutting edges of the shaving wheel are made of carbide and include an anti-wear coating.

4. Method according to claim 1, wherein to generate the profile on the blank, the tool spindle and the work spindle are rotated at rotational speeds of at least 1000 to 2000 revolutions/min.

5. Method according to claim 2, wherein to generate the profile on the blank, the tool spindle and the work spindle are rotated at rotational speeds of at least 1000 to 2000 revolutions/min.

6. Method according to claim 3, wherein to generate the profile on the blank, the tool spindle and the work spindle are rotated at rotational speeds of at least 1000 to 2000 revolutions/min.

7. Method according to claim 1, wherein to generate the profile on the blank, the shaving wheel is guided relative to the blank at an axis intersection angle ($\Sigma$) which is between 15° and 25°.

8. Method according to claim 2, wherein to generate the profile on the blank, the shaving wheel is guided relative to the blank at an axis intersection angle ($\Sigma$) which is between 15° and 25°.

9. Method according to claim 3, wherein to generate the profile on the blank, the shaving wheel is guided relative to the blank at an axis intersection angle ($\Sigma$) which is between 15° and 25°.

10. Method according to claim 2, wherein to generate the profile on the blank, the shaving wheel is guided relative to the blank at an axis intersection angle ($\Sigma$) which is between 15° and 25°.

11. Method according to claim 1, wherein said part is a vehicle shaft hub connection.

* * * * *